US012645989B2

(12) United States Patent
Butt et al.

(10) Patent No.: US 12,645,989 B2
(45) Date of Patent: Jun. 2, 2026

(54) DISTRIBUTED TRAINING IN COMMUNICATION NETWORKS

(71) Applicant: NOKIA SOLUTIONS AND NETWORKS OY, Espoo (FI)

(72) Inventors: Muhammad Majid Butt, Palaiseau (FR); Stephen Mwanje, Dorfen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 672 days.

(21) Appl. No.: 18/040,406

(22) PCT Filed: Aug. 3, 2020

(86) PCT No.: PCT/EP2020/071756
§ 371 (c)(1),
(2) Date: Feb. 2, 2023

(87) PCT Pub. No.: WO2022/028663
PCT Pub. Date: Feb. 10, 2022

(65) Prior Publication Data
US 2023/0289656 A1 Sep. 14, 2023

(51) Int. Cl.
*G06N 20/00* (2019.01)
*H04L 41/16* (2022.01)
(52) U.S. Cl.
CPC ............. *G06N 20/00* (2019.01); *H04L 41/16* (2013.01)
(58) Field of Classification Search
CPC ........ G06N 20/00; H04L 41/16; H04L 41/145
See application file for complete search history.

(56) References Cited

U.S. PATENT DOCUMENTS

2019/0318240 A1* 10/2019 Kulkarni .................. G06N 3/08
2020/0219015 A1* 7/2020 Lee ........................ G06F 18/214

FOREIGN PATENT DOCUMENTS

| WO | 2022/008037 A1 | 1/2022 |
| WO | 2022/028664 A1 | 2/2022 |
| WO | 2022/028665 A1 | 2/2022 |

OTHER PUBLICATIONS

Yang et al., "Scheduling Policies for Federated Learning in Wireless Networks", IEEE Transactions on Communications, vol. 68, No. 01, Jan. 2020, pp. 317-333.
Chen et al., "Convergence Time Optimization for Federated Learning over Wireless Networks", arXiv, Jan. 22, 2020, pp. 1-30.
(Continued)

*Primary Examiner* — Pei Yong Weng
(74) *Attorney, Agent, or Firm* — Carter, DeLuca & Farrell LLP

(57) ABSTRACT

It is provided a method comprising: monitoring if a distributed training host receives a request from a meta-training host to provide a machine learning model; checking whether a link from the distributed training host to the meta-training host is required for another data communication having higher priority than providing the machine learning model such that the other data communication will block the link for the providing the machine learning model to the meta-training host; informing the meta-training host, in response to the request, that the link is required for the other data communication if the link is required for the other data communication.

1 Claim, 5 Drawing Sheets

(56) References Cited

OTHER PUBLICATIONS

Hurwitz et al., "Machine Learning for Dummies", IBM, 2018, 75 pages.

International Search Report and Written Opinion received for corresponding Patent Cooperation Treaty Application No. PCT/EP2020/071756, dated Apr. 7, 2021, 19 pages.

\* cited by examiner

Fig. 7
Fig. 9
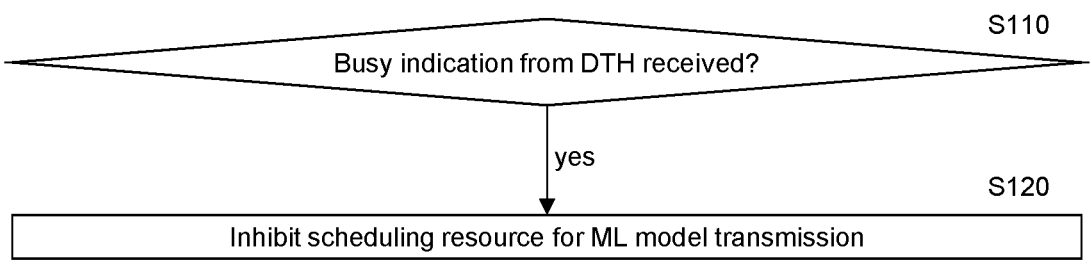
Fig. 8

DISTRIBUTED TRAINING IN COMMUNICATION NETWORKS

CROSS-REFERENCE TO RELATED APPLICATIONS

This application is a national phase entry of International Application No. PCT/EP2020/071756, filed Aug. 3, 2020, the contents of which are hereby incorporated by reference in their entirety.

FIELD OF THE INVENTION

The present disclosure relates to distributed training of an ML model in a communication network.

Abbreviations

3GPP $3^{rd}$ Generation Partnership Project
3G/4G/5G $3^{rd}/4^{th}$
5th Generation
AI Artificial Intelligence
BS Base Station
CNF Cognitive Network Function
CU Centralized Unit
DTH Distributed-Training Host
DU Distributed Unit
eNB evolved NodeB (4G base station)
FL Federated Learning
gNB 5G base station
ML Machine Learning
MTC Machine-Type Communication
MTH Meta-Training Host
NG-RAN Next Generation RAN
OAM Operation and Maintenance
ORAN Open RAN
QoS Quality of Service
RAN Radio Access Network
RB Resource Block
RIC RAN Intelligent Controller
SRB Signalling Radio Bearer
Tx Transmit
UE User Equipment
WiFi Wireless Fidelity

BACKGROUND OF THE INVENTION

Increased automation in networks implies that autonomy needs to be extended to ever more aspects of the network. In network management, designing algorithms for optimization of the network has proven to be complex. To overcome this challenge, Artificial Intelligence and Machine Learning (AI/ML) approaches, which eliminate the need for human design of the required algorithms, have been proposed. These AI/ML algorithms may be deployed in the network and service management planes where they replace human effort in fault, capacity and performance management for network domains and user services.

Machine learning is a form of Artificial Intelligence that enables a system to learn from data rather than through explicit programming (taken from Machine Learning For Dummies, IBM Limited Edition, Wiley page 4. https://www.ibm.com/downloads/cas/GB8ZMQZ3).

In managing the call sessions, a lot of data on the performance of the session and on the devices involved in such session is available and can be collected. This data can be used for optimizing and troubleshooting the call sessions using AI/ML algorithms. Similarly, the amount of human effort spent on developing optimal algorithms for signal processing should be reduced which can be achieved with the use of AI/ML algorithms able to learn the optimal processing.

The end result is that different areas of the network will be filled with AI/ML functions (herein also called Cognitive Network Functions (CNFs)) with learning being possible at different parts and domains of the network. For some of this learning, a distributed approach may be used (distributed learning).

FL is a form of machine learning where, instead of model training at a single node, different nodes perform the training in a distributed way. In a distributed machine learning model, a single ML model training is performed distributed to use computation powers of different nodes. Federated learning is different from distributed learning in the sense that each distributed node has its own local training data which may not come from the same distribution; each host (also named distributed training host) computes parameters of its local ML model (in short: computes its ML model) and the central host combines the parameters of all the models to generate a main model. The objective of this approach is to keep the training dataset where it is generated and perform the model training locally at each individual learner (DTH) in the federation. After training a local model, each individual learner transfers its local model (i.e., the parameters thereof) to an aggregating unit (MTH). Optionally, each DTH may also transmit a subset of its own training data to MTH. The MTH utilizes the local model parameters to update an aggregated model (meta-model) which is eventually fed back to the individual local learners for their use. As a result, each local learner (DTH) benefits from the datasets of the other learners only through the aggregated model, shared by the aggregator, without explicitly accessing high volume of training data. Also, data privacy may be improved in this way because the training data may be privacy-sensitive.

An optimum number of local learners to participate in updating the meta-model, grouping of the local learners, and frequency of local updates and aggregation thereof into the aggregated model, that induce a trade-off between model performance and resource preservation, are application dependent.

Federated learning over wireless networks is very recently investigated topic. Some of the most recent works are:
  H. H. Yang, Z. Liu, T. Q. S. Quek and H. V. Poor, "Scheduling Policies for Federated Learning in Wireless Networks," in *IEEE Transactions on Communications*, vol. 68, no. 1, pp. 317-333, January 2020.
  M. Chen, H. V. Poor, W. Saad, and S. Cui, "Convergence Time Optimization for Federated Learning over Wireless Networks", arXiv:2001.07845, 2020.
  These references discuss optimization problems related to scheduling problems in FL over wireless networks.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: monitor if a distributed training host receives a request from a meta-training host to provide a machine learning model; check whether a link from the distributed training host to the meta-training host is required for another data communication having higher priority than providing the machine learning model such that the other data communication will block the link for the providing the machine learning model to the meta-training host; inform the meta-training host, in response to the request, that the link is required for the other data communication if the link is required for the other data communication.

According to a second aspect of the invention, there is provided an apparatus comprising: one or more processors, and memory storing instructions that, when executed by the one or more processors, cause the apparatus to: monitor whether, in response to a request from a meta-training host to a distributed training host to provide a machine learning model, a busy information is received that a link from the distributed training host to the meta-training host is required for another data communication than providing the machine learning model; inhibit scheduling a first resource on the link for the providing the machine learning model if the busy information is received.

According to a third aspect of the invention, there is provided a method comprising: monitoring if a distributed training host receives a request from a meta-training host to provide a machine learning model; checking whether a link from the distributed training host to the meta-training host is required for another data communication having higher priority than providing the machine learning model such that the other data communication will block the link for the providing the machine learning model to the meta-training host; informing the meta-training host, in response to the request, that the link is required for the other data communication if the link is required for the other data communication.

According to a fourth aspect of the invention, there is provided a method comprising: monitoring whether, in response to a request from a meta-training host to a distributed training host to provide a machine learning model, a busy information is received that a link from the distributed training host to the meta-training host is required for another data communication than providing the machine learning model; inhibiting scheduling a first resource on the link for the providing the machine learning model if the busy information is received.

Each of the methods of the third and fourth aspects may be a method of distributed training.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

federated learning may be adopted to the characteristics of communication networks;

in particular: other high priority communication tasks are not hindered by the federated learning;

resources of the communication network may be optimally exploited for machine learning model transfer.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 7 shows an apparatus according to an example embodiment of the invention;

FIG. 8 shows a method according to an example embodiment of the invention; and

FIG. 9 shows an apparatus according to an example embodiment of the invention.

DETAILED DESCRIPTION OF CERTAIN EMBODIMENTS

Figure 1:
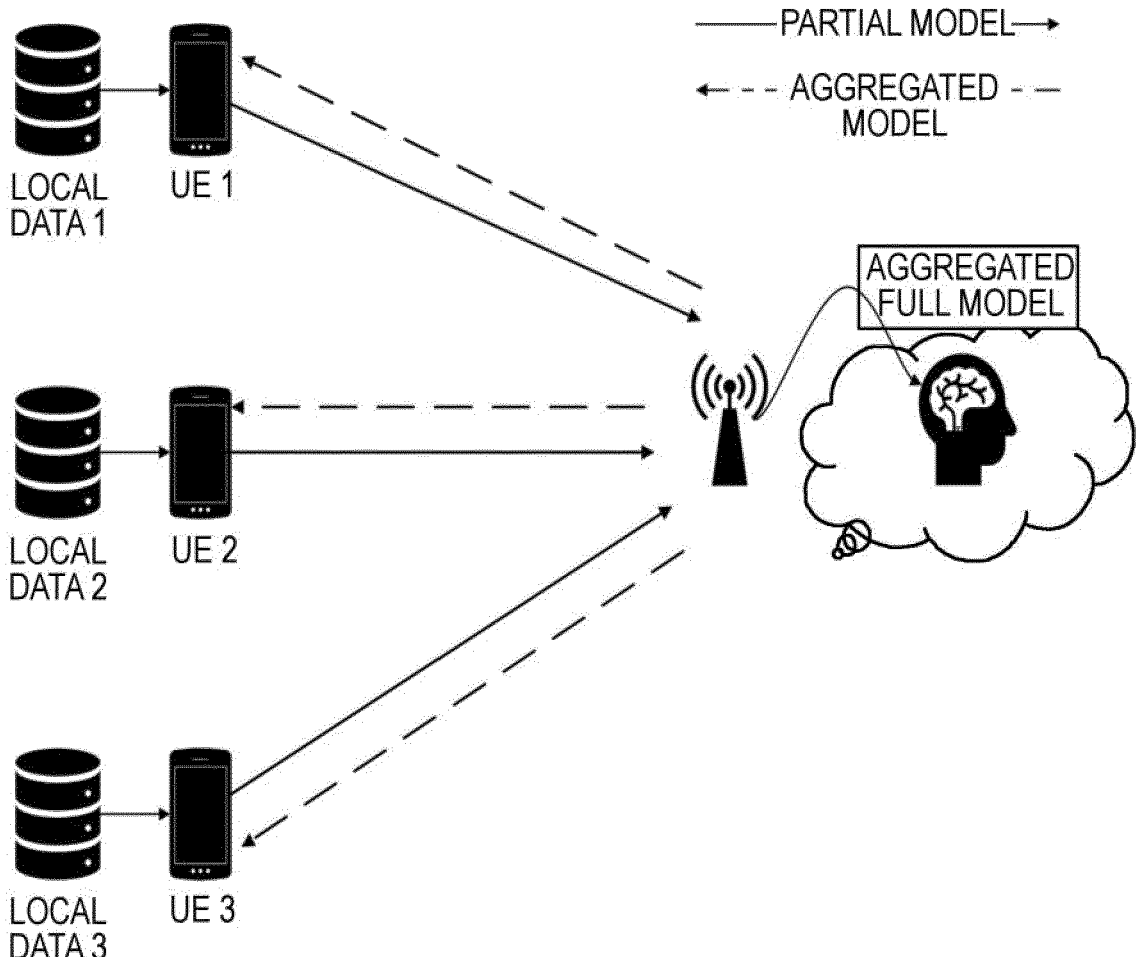
FIG. 1 shows a block diagram of federated learning in a wireless network.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention provide a system and mechanism for model collection from the distributed hosts in a federated learning system.

For some network-related machine learning use cases, training may be done in a distributed way but yet the different observations of the distributed units need to be aggregated for good decision at inference. Each instance of the model at the distributed entity has only a subset of the data available for the training because it does not have the data of the other instances of the distributed entity. Thus, only suboptimal performance can be achieved using a model trained separately at each instance of the distributed entity. Better performance may be achieved with a single model that combines the knowledge of the different model instances.

Examples of such use cases include the following:
  1. NG-RAN-UE: It may be preferred to undertake training at the UE instead of training in the e/gNB. This is the case if the amount of data required (or used) for training would be too much to be signalled from the UE across the expensive wireless channel to e/gNB. An example application here could be to create a model of the relationship between the localization and mobility observations of the UE. The ML model is preferably trained at the UE to minimize the amount of data exchange, while the different models trained at the UE should be aggregated at the gNB to create a single model for the entire cell.
  2. Core Network-UE: with so many UEs in the network, learning the performance of different call sessions at a centralized location may imply sending large amounts of data throughout the network. Instead, part of the training could be done in a distributed form at the UEs, and the models are aggregated in the Core network after they are adequately trained by the UE.

3. CU-DU: In a split gNB, it may be necessary to learn a policy at the centralized Unit (CU) using data available at the distributed Units (DUs). Yet again, the transmission if such data may clog the available signaling resources between the DUs and CU. Hence, one may undertake some of the learning at the DUs and aggregate the learned models at the CU.

4. OAM-gNB: A typical implementation of centralized network optimization solutions is that the base stations send the data to the OAM for the OAM to figure out what to do. This is fine if the OAM relies on small amount of data (e.g. on single events) combined with more or less complex human designed algorithms to select the decision. For learning the decision however, large amounts of data may be needed the transfer of which to OAM may be too costly for the network. Instead, it may be better if part of the training is done in a distributed form at the base stations, and the learned models are aggregated at the OAM. The same may apply if a standalone automation platform replaces the general-purpose OAM in undertaking the network automation, as it is proposed in ORAN by introducing the RIC.

The concept of distributed learning has not been extensively used in communication networks, although these networks can significantly benefit from its application. There are no mechanisms defined to implement or support such learning, be it between the base stations and UEs, between the core network and UEs, or between OAM or its related automation platforms and the base stations from which the training data is sourced.

Some example embodiments of the invention provide a mechanism to support distributed training of machine learning models in communication networks and the related aggregation of the models through a meta learning process. The entity that undertakes distributed training, herein called a Distributed Training Host (DTH), trains and generates a sub-model while the entity that aggregates the sub-models, here called the Meta Training Host (MTH), generates the final aggregated model, also called a Meta-model.

Some example embodiments of the invention are particularly relevant for interface examples 1 to 3 of the list hereinabove because these interfaces may be involved in data transmission by a user (terminal, e.g. UE) of the network. Note that the list is not exhaustive for the invention. The invention is explained hereinafter in detail for the interface example 1 (interface UE-RAN) because resources on this air interfaces are particularly rare and valuable.

Figures 2, 3:
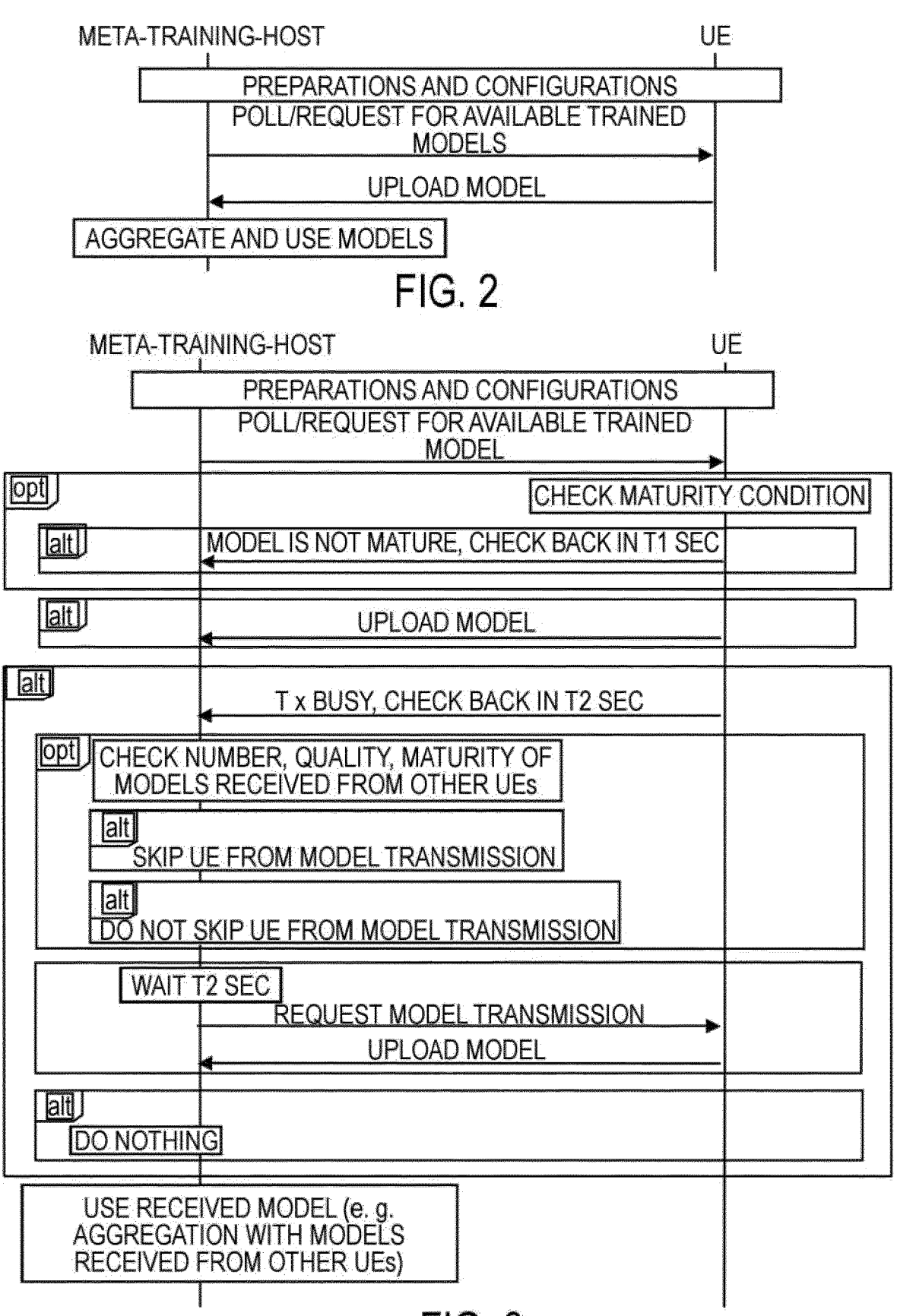
FIG. 2 shows a message flow corresponding to the block diagram of FIG. 1.
FIG. 3 shows a message flow according to some example embodiments of the invention.

In a wireless network, UEs transmit their local FL models (after the models are trained using their locally collected data) to a base station (gNB) on regular communication links. The gNB, acting as a central controller, generates an aggregated FL model using the received local FL models. gNB may broadcast the aggregated FL model back to all UEs, as illustrated in FIG. 1. A corresponding message flow is shown in FIG. 2. Since each UE has unique training data samples, the gNB prefers to include all local FL models to generate an aggregated FL model. However, the transmission of the model (i.e. of the parameters of the model) is resource intensive on the UE's transmission resources because there is a limited number of resource blocks (RBs) on a wireless channel. On the other side, UEs may have other data (e.g. for ongoing service transactions) which they would like to transmit without much disruptions in view of some QoS requirements.

The convergence time for federated learning includes not only the computation time on the local learners and the aggregator but also the communication time between them which depends on the wireless channel quality as well as data transmission requirements of the UEs (which delay model transmission). Hence, the FL performance and convergence time will be significantly affected by model collection scheduling. Some example embodiments provide a solution to the problem of:

Designing an Appropriate Model Collection Scheduling Method that Helps FL Model Converge with Minimum (or No) Loss to QoS of the UEs.

Some example embodiments of the invention provide a method and means to enable the UE to transmit its locally trained model to the gNB at the earliest possibility while also accounting for the UE's own communication requirements. For this reason, the UE, upon receipt of a request from the gNB to transmit the locally trained model, checks if the transmission of the locally trained model to the gNB is possible without jeopardizing another data transmission to the gNB having higher priority. The priority of the other data transmission may be higher e.g. because there is a corresponding QoS requirement for the other data transmission. If the link (uplink) to the gNB will be required for the other data transmission, the UE indicates to the gNB that the uplink will be required for the other transmission, and the UE does not transmit the locally trained model in response to the received request.

In addition, in some example embodiments, it is considered if the locally trained model is sufficiently mature. In some example embodiments, the check whether or not the uplink is required for the another data transmission is performed only if the locally trained model is sufficiently mature. That is, in such example embodiments, the transmission of the trained model from the UE is delayed in cases where the model has been maturely trained but where UE has other pending data to be transmitted on the uplink.

Some example embodiments of the invention provide messages for expressing constraints related to the UE's transmission requirements and options for the course of action from the gNB. Some example embodiments of the invention provide the following feature:

The UEs which require the uplink for another data transmission choose not to immediately transmit their locally trained models. Instead, the UE sends an indication that the link is required for another data transmission (e.g. transmission resources to gNB not available for the model transmission).

In addition, in some example embodiments, each UE indicating the link being required, may inform the gNB on a respective time to be considered by the gNB for receiving the model from that UE. Each of the UEs may send its own respective time, determined independently from any of the other UEs. The time may have one of two different meanings:

a) The time may be an estimate that indicates that there is a high probability that the UE will finish its other transmission by that time and that the UE will then be able to transmit its updated model on the uplink. The gNB may request again the UE to provide the locally trained model after that time.

b) The time may indicate the UE is sure to have finished its other transmission and will begin the model transmission after the time expires. In this case, the gNB may schedule a resource for the transmission at that time and wait for the model to be delivered at that time. This option has lower signaling overhead than option a), but the UE has the responsibility to calculate the time based on its data transmission requirements and potentially other data scheduling parameters.

In some example embodiments, the UE is equipped with only one of the corresponding algorithms. Hence, UE may indicate only the respective one of these times. In some example embodiments, the UE is equipped with both of these algorithms, and the UE may send either of these times depending on circumstances. In some example embodiments, a UE being equipped with both of these algorithms may send both of these times. If a UE being equipped with the algorithm b) cannot determine the time when it is sure to have finished the pending transmission, it may indicate a time very far in the future (e.g. one day or one month) for this time, or may not indicate any time.

If the uplink from a UE is required for another data transmission, the UE may not immediately transmit its locally trained model(s) to gNB. It may signal to gNB to ping (request) it again after a short time interval. There is a high probability that the UE will have finished its other transmission by that time and will be able to transmit its updated model. In some example embodiments, this time interval may be configured by the network, e.g. based on general considerations. In such example embodiments, the UE may not provide any time indication to the gNB because it is anyway known by the gNB from the configuration.

The UE may also decide not to send the locally trained model because it is not sufficiently mature. In this case, typically, the gNB should ping (request) the UE after a long time interval (relative to the time interval indicated when the uplink is required for another data transmission) because maturing a ML model may take quite some time. By requesting the UE after a long time interval, unnecessary signalling overhead for further unsuccessful attempts may be saved.

The MTH (gNB) may request the UE again when it requests for delayed response due to its other communication requirements. However, if MTH collects enough models from other UEs and the aggregated model converges, it may decide to skip those UEs indicating that their uplink is required for another communication for this round of model updates. There may be more reasons why gNB decides not to request later the locally trained model from a UE with required uplink. E.g., the generation or updating of the aggregated model may be abandoned. Also, the gNB may be busy with other tasks at that time such that the gNB defers the request to the UE by some additional time interval.

Hereinafter, an example embodiment is described at greater detail, wherein the UE checks both whether the local model is sufficiently mature and whether its uplink is required for another data transmission. An example embodiment where the UE does not check if the local model is sufficiently mature may be derived from this model by assuming that the check for maturity is always affirmative (i.e., the model is assumed to be mature, regardless of whether or not it is actually mature).

ML model maturity defines how mature the ML model is in terms of the training process. For example, it may be based on at least one of:

Time (the UE decides how mature the ML model is by determining how long the ML model was trained, or how much time elapsed since the ML model was uploaded to the UE). The attribute of the ML model defines the assessment condition for the UE, i.e. how the UE should determine ML model maturity with regard to time. It may have values like "short", "medium", or "long" or it may indicate explicitly the time elapsed since beginning of the training or since the ML model was uploaded to the UE.

Threshold (the UE decides how mature the ML model is). This can be decided by the UE by determining how much the trained data deviate from the original ML model or if convergence is reached within a certain threshold of confidence in the trained ML model. Alternatively, the threshold may comprise a classification decision threshold that would mean that the trained ML Model decides to perform an action when the classification threshold is exceeded and a different action when it is not exceeded.

Model Size (the UE decides how mature the ML model is by determining the size of data used for the training; the bigger the size, the more mature the model is. Model size may be calculated after the ML model has been trained long enough, e.g., some time has elapsed or certain behavior on model convergence is observed. The attribute/parameter may have values like "small", "medium", and "large". Additionally, model size could depend on the actual size in megabytes needed to describe a trained ML model in terms of the total number of layers, type of layers, output shape of each layer, number of weights per layer, etc.

In this example embodiment, the UE checks first if the model is sufficiently mature, and only then, it checks whether or not its uplink is required for another data transmission. Thus, when the gNB requests for the model, one of three statuses may be determined, as described in Table 1, namely Immature, Mature_available or Mature_Busy. UE may provide the status indications "Immature" and "Mature_busy" to the gNB in response to the request to provide the trained ML model. Instead of or in addition to the status indication "Mature_available", it may provide the trained ML model to the gNB upon the request. In some example embodiments, instead of or in addition to the status "immature", the status "Static" may be used. It describes a case that the model parameters are not different (or at least not substantially different, wherein the meaning of the term "substantially" is model dependent) from the ones already provided at a previous update of the local model at the gNB. If only one of the statuses "immature" and "static" is used, it may include the information of the other of these statuses.

TABLE 1

UE status and response summary

| UE Status | UE signal options | Description and action options | Configuration | Comments |
|---|---|---|---|---|
| Static (or immature) | Static (or immature), optionally: | Model parameters are notdifferent from the ones | Long_Pingback_timer is specified and known at MTH, | No need to send model if not |

TABLE 1-continued

| | | UE status and response summary | | |
| --- | --- | --- | --- | --- |
| UE Status | UE signal options | Description and action options | Configuration | Comments |
| | long_pingback_timer | already transmitted, or model is not mature. Ping after long time interval - increases probability of differently trained model. | or DTH computes a ping-back-timer depending on its frequency of training data | mature. |
| Mature available | Ready to transmit | Model is mature and uplink is available to transmit the model (No other data to transmit that prevent transmission of model). | Maturity Condition is specified or configured | gNB may choose low priority signaling ("SRB4" having lower priority than standardized SRB1 to SRB3) |
| Mature_busy | Mature_Busy (or only "Busy"), optionally short_pingback_timer | Model is mature but uplink is required for another data transmission. Ping again for shorter time interval. | Short_pingback_timer is specified and known at MTH, or DTH computes a short_pingback_timer depending on its other-data transmission requirements | Simple for UE and no burden of computing the exact time for model transmission |
| | Mature_Busy (or only "Busy"), optionally in wait-timer | Model is mature but uplink is required for another data transmission. DTH will send the model in wait_timer_interval after which UE assumes not to be busy. | DTH computes a Wait_timer depending on its other-data transmission requirements | Complex for UE, reduced signaling overhead. |

The three outcomes represent the combination of the status of the training and the status of the UE's transmission resources. These combinations result in three of four UE's responses, depending on whether or not the check for the transmission resources is performed if the model is not mature:

1. Static_model (or Immature_model): The UE's model is not sufficiently matured and UE decides not to transmit its model. The UE asks gNB to ping after long_ping-_back_timer interval (represented by timer T1 in FIG. 3), so that probability of a matured model is high.

2. Mature_available: The model is updated/matured and uplink is available for transmission of the model.

3. Mature_Busy: The model is matured, but the uplink is required for another data transmission. This status is given in particular if it is important to protect UE's QoS. gNB may have configured the UE with a short-_ping_back_timer (represented by timer T2 in FIG. 3) and checks again (hoping that data transmission will be completed by then). Note that Timer T2<T1 because, typically, a (static) state with not fully matured model will take longer time before it gets matured than UEs transmission time of other data. Since the model is available, the gNB will attempt in shorter time period to retrieve the model instead of waiting for long time as in Static_model state.

In an embodiment, instead of using the gNB-configured short_ping_back_timer (T2), the UE computes a wait timer T3, computed e.g. based on the amount of pending other data. The gNB may then wait for the model or indicate that the wait time is too long and that the model is no longer needed.

FIG. 3 shows a message flow according to some example embodiments of the invention:

1. After the preparations and configurations of the model, the MTH (gNB) requests the UE for available and trained model.

2. In this example embodiments, the UE first checks if the model is mature.

3. If the model is not mature (e.g. static), the UE replies to MTH that the model is not mature (e.g. static). In addition, it may indicate a time T1, after which the gNB may request the UE again to provide the trained model.

4. If the model is mature and the uplink is available for transmission of the ML model, the UE may upload the model to MTH.

5. If the uplink is required for another data transmission (e.g. the TX will be busy), instead of uploading the model, the UE sends an indication that its transmission resources will be busy, i.e., it may send a "Tx Busy status".

6. The Tx Busy status from the UE may include a time T2, here called a "short_pingback timer" to give an indication to the gNB when to check again a. The pingback timer is a shorter interval that tells the gNB when to check back on the UE to see if that UE is then able to transmit the model on the uplink. The short_pingback time may be configured by the network (e.g. the same time for all UEs of the federated learning system), or it may be calculated by UE (e.g. based on some constraints configured by the network; an example constraint may be maximum duration of the short_pingback time). The indication of the time T2 may be omitted if the MTH knows it due to the configuration by the network.

b. The MTH (gNB) may check back the UE when it requests for delayed response due to its own communication requirements. If MTH collects enough models from other UEs and the aggregated model converges, it may decide to skip UE for this round of model updates.

7. As a still further option, UE may do nothing in response to the request from the MTH if the uplink is required for another data transmission.

8. When the MTH receives sufficient trained models, it may aggregate them and use them for training the meta-model (aggregated model).

Figure 4:
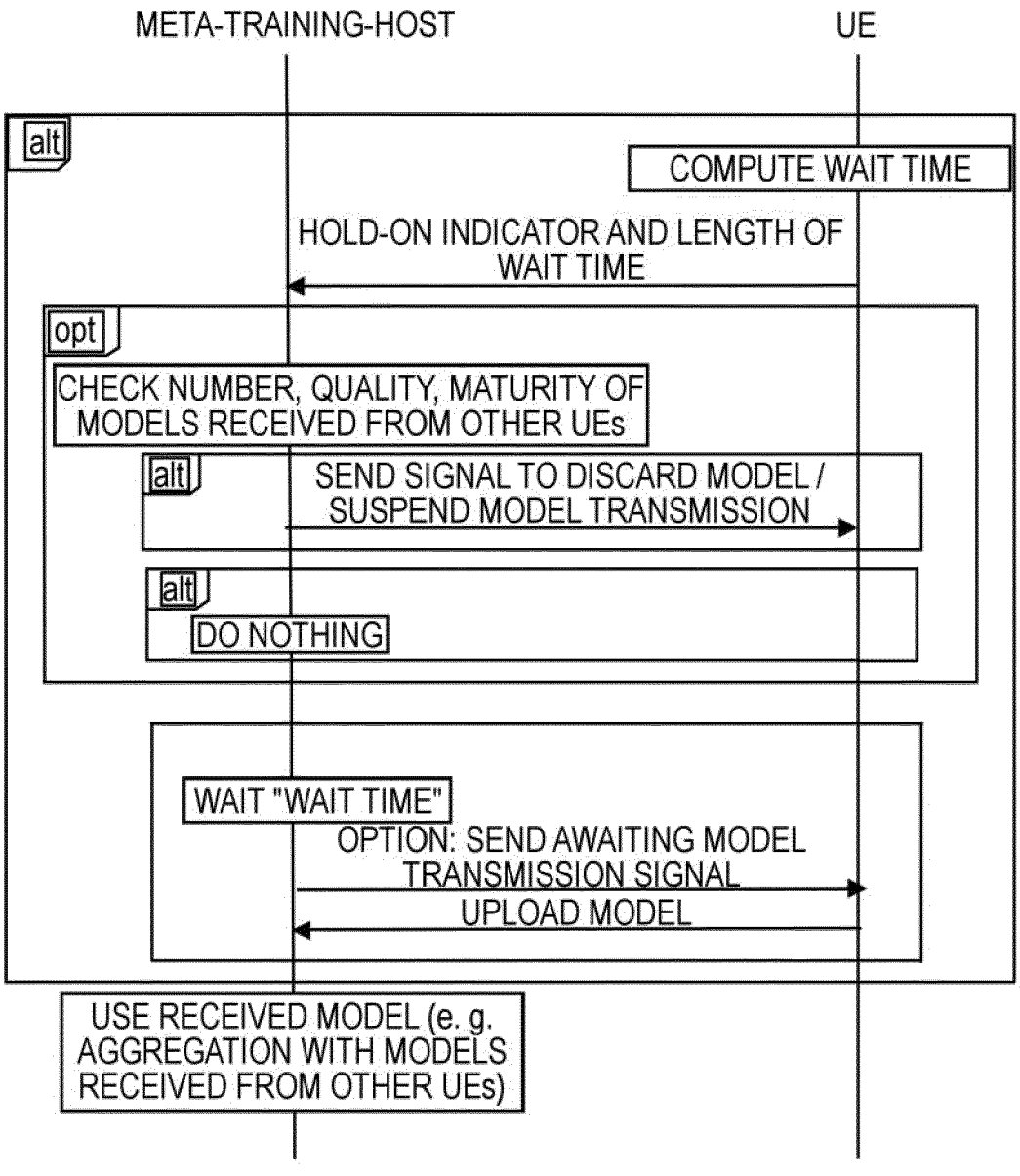
FIG. 4 shows a message flow according to some example embodiments of the invention.

FIG. 4 shows a message flow according to another example embodiment of the invention. The message flow of FIG. 4 replaces the messages 5 to 8 of FIG. 3. In the state Mature_busy, instead of using a timer T2 as described in message 6 of FIG. 3, each UE can itself configure its timer, here called a "wait timer" determining a "wait time", e.g. based on its data transmission requirements and scheduling parameters. In this case, signalling between gNB and UE is reduced because gNB does not make unsuccessful attempts after receiving Mature_busy state signal from the UE. It exactly knows when to fetch the mature model from each UE. However, UE needs all the scheduling information for computing this timer and procedural complexity moves towards UE.

In some example embodiments, similar to FIG. 3, MTH may check if the transmission of the model from the UE is still required in view of the number, quality, and/or maturity of models received from other UEs. MTH may perform the check at any time after it received the indication of the wait time from UE until the wait time has elapsed. If the model from the UE is not required, in the example of FIG. 4, MTH sends a message (such as a signal) to the UE to discard (or suspend) the transmission of the model. If UE does not get any message to discard (or suspend) the transmission, UE uploads the model to MTH (gNB) after the wait time.

In some example embodiments, following the wait time, the MTH (gNB) may inform the UE that MTH still expects the model. For example, this information may be send if MTH determines that the transmission of the model from the UE is still required in view of the number, quality, and/or maturity of models received from other UEs. In these cases, the information that the MTH still expects the model may be used as an alternative to not sending the message to the UE to discard (suspend) the transmission of the model. However, in some example embodiments, MTH may inform the UE that MTH still expects the model even if MTH does not check if the transmission of the model from the UE is still required in view of the number, quality, and/or maturity of models received from other UEs. For example, the message may be considered as a kind of a heartbeat between the ML model applications on the UE and on the gNB. In these example embodiments (i.e., in example embodiments, where the MTH may inform the UE after the wait time that MTH still expects the model), UE uploads the model to MTH (gNB) only if it receives the information that MTH still expects the model.

In some example embodiments, MTH may be enabled to send a message to the UE to discard (or suspend) the transmission and to send an information to the UE that MTH still expects the model. Depending on the implementation, UE may upload the model to MTH after the wait time only if UE does not receive the message on discarding and UE receives the information that MTH still expects the model. In other implementations, UE may upload the model to MTH after the wait time if at least one of the above conditions (i.e. UE does not receive the message on discarding, and UE receives the information that MTH still expects the model) is fulfilled.

In some example embodiments, MTH does not send any message to the UE to discard (or suspend) the transmission and does not send any information to the UE that MTH still expects the model. In such example embodiments, UE uploads the model to MTH after the wait time. In such example embodiments, MTH typically does not check if the transmission of the model from the UE is still required in view of the number, quality, and/or maturity of models received from other UEs.

Figure 5:
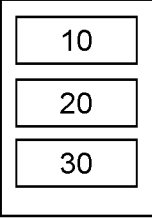
FIG. 5 shows an apparatus according to an example embodiment of the invention.
Figure 6:
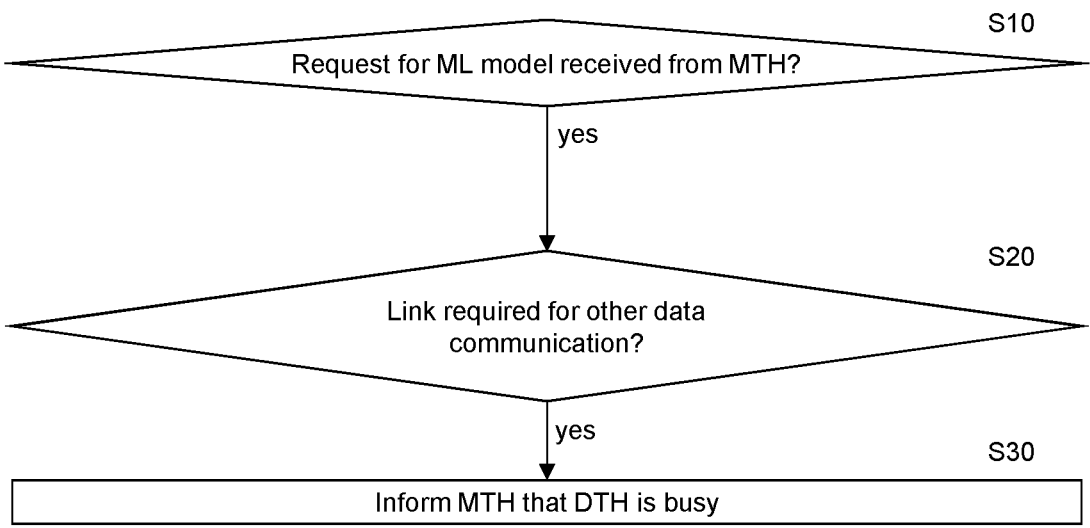
FIG. 6 shows a method according to an example embodiment of the invention.

FIG. 5 shows an apparatus according to an example embodiment of the invention. The apparatus may be a DTH, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for monitoring 10, means for checking 20, and means for informing 30. The means for monitoring 10, means for checking 20, and means for informing 30 may be a monitoring means, checking means, and informing means, respectively. The means for monitoring 10, means for checking 20, and means for informing 30 may be a monitor, checker, and informer, respectively. The means for monitoring 10, means for checking 20, and means for informing 30 may be a monitoring processor, checking processor, and informing processor, respectively.

The means for monitoring 10 monitors if a distributed training host receives a request from a meta-training host to provide a machine learning model (S10). For example, the distributed training host may be a UE, and the meat-training host may be a gNB.

The means for checking 20 checks whether a link from the distributed training host to the meta-training host is required for another data communication having higher priority than providing the machine learning model such that the other data communication will block the link for the providing the machine learning model to the meta-training host (S20).

S10 and S20 may be performed in any arbitrary sequence. S10 and S20 may be performed fully or partly in parallel. In some example embodiments, S20 is only performed if the distributed training host receives the request (S10=yes).

If the link is required for the other data communication (S20=yes), the means for informing 30 inform the meta-training host, in response to the request (S10), that the link is required for the other data communication (S30).

If the MTH (gNB) receives the busy indication (i.e., that the link is required for another data communication), it should typically not schedule any resource for the transmission of the machine learning model. Nevertheless, in some example embodiments, the apparatus may additionally comprise a means for inhibiting. The means for inhibiting may be an inhibiting means, or an inhibitor, or an inhibiting processor. If the link is required for the other data communication (S20=yes), the means for inhibiting inhibits providing, in response to the request (S10), the machine learning model to the meta-training host on the link. S30 and the inhibiting may be performed in any arbitrary sequence. S30 and the inhibiting may be performed fully or partly in parallel.

FIG. 7 shows an apparatus according to an embodiment of the invention. The apparatus may be a MTH, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for monitoring 110 and means for inhibiting 120. The means for monitoring 110 and means for inhibiting 120 may be a monitoring means and inhibiting means, respectively. The means for monitoring 110 and means for inhibiting 120 may be a monitor and inhibiter, respectively. The means for monitoring 110 and means for inhibiting 120 may be a monitoring processor and inhibiting processor, respectively.

The means for monitoring 110 monitors whether a busy information is received (S110). The busy information is received in response to a request from a meta-training host to the distributed training host to provide a machine learning model. The busy information indicates that a link from the distributed training host to the meta-training host is required for another data communication than providing the machine learning model.

If the busy information is received (S110=yes), the means for inhibiting 120 inhibits scheduling a resource on the link for the providing the machine learning model (S120).

On the other hand, if the busy information is not received in response to the request to the distributed training host to provide a machine learning model, in some example embodiments, the apparatus may allow the meta-training host (gNB) to schedule a resource for the transmission of the model on the link (uplink) from the distributed training host to the meta-training host. Whether or not the resource is actually scheduled may depend on other conditions, too.

FIG. 9 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 6 and 8 and related description.

Some example embodiments of the invention are described where the uplink is required for another data transmission with a higher priority than providing the local ML model. However, this is not the only potential reason why the UE does not provide the local ML model on request from the gNB. For example, the processing power and/or the memory of the UE may be exhausted due to other tasks with higher priority. In these cases, the UE may indicate to the gNB that it is busy and does not provide the local ML model on the request from the gNB.

Some example embodiments are explained with respect to a 5G network. However, the invention is not limited to 5G. It may be used in 3G or 4G networks and 3GPP networks of future generations if they support distributed training. It is not even limited to 3GPP networks. It may be used in other wired or wireless communication networks (e.g. WiFi networks).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

A terminal (UE) may be e.g. a mobile phone, a smartphone, a MTC device, a laptop etc. The user may be a human user or a machine (e.g. in machine-type communication (MTC)).

A gNB is an example of a base station to which some example embodiments of the invention are applicable. Another example is an eNB. The MTH may be integrated with the base station or stand-alone therefrom.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a distributed training-host such as a UE, an MTC device, a RAN network element (such as a gNB or eNB) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an meta-training host such as a RAN, or a component thereof (e.g. eNB or gNB), an OAM, or an automation platform, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. A user equipment apparatus comprising:
one or more processors; and
memory storing instructions that, when executed by the one or more processors, cause the UE apparatus to:
  monitor if a distributed training host receives a request from a meta-training host to provide a machine learning model;
  decide if the machine learning model is mature based on at least one of: (i) an elapsed training time satisfying a threshold, (ii) a convergence criterion being satisfied, or (iii) a size of training data used for training the machine learning model satisfying a threshold;

if the machine learning model is not mature: inform the meta-training host, in response to the request, that the machine learning model is not mature; and inhibit providing the machine learning model to the meta-training host on the link;

if the machine learning model is mature: check whether a link from the distributed training host to the meta-training host is required for another data communication having higher priority than providing the machine learning model such that the other data communication will block the link for the providing the machine learning model to the meta-training host; and check if the distributed training host is busy with another task, wherein the distributed training host is determined to be busy when at least one of: (i) processing power of the distributed training host is unavailable for providing the machine learning model, or (ii) memory of the distributed training host is unavailable for providing the machine learning model;

if the distributed training host is busy: deny providing the machine learning model to the meta-training host on the link;

if at least one of the processing power of the distributed training host and the memory of the distributed training host is blocked: deny providing the machine learning model to the meta-training host on the link;

if the link is required for the other data communication: inform the meta-training host, in response to the request, that the link is required for the other data communication if the link is required for the other data communication;

inhibit providing the machine learning model to the meta-training host on the link in response to the request;

compute a providing time when the machine learning model will be provided; inform the meta-training host on the providing time;

if a cancellation of the request is not received: provide the machine learning model to the meta-training host via the link at the providing time; determine whether a cancellation of the request is received; and inhibit the providing the machine learning model at the providing time if the cancellation is received.

* * * * *